Figures 1, 2:
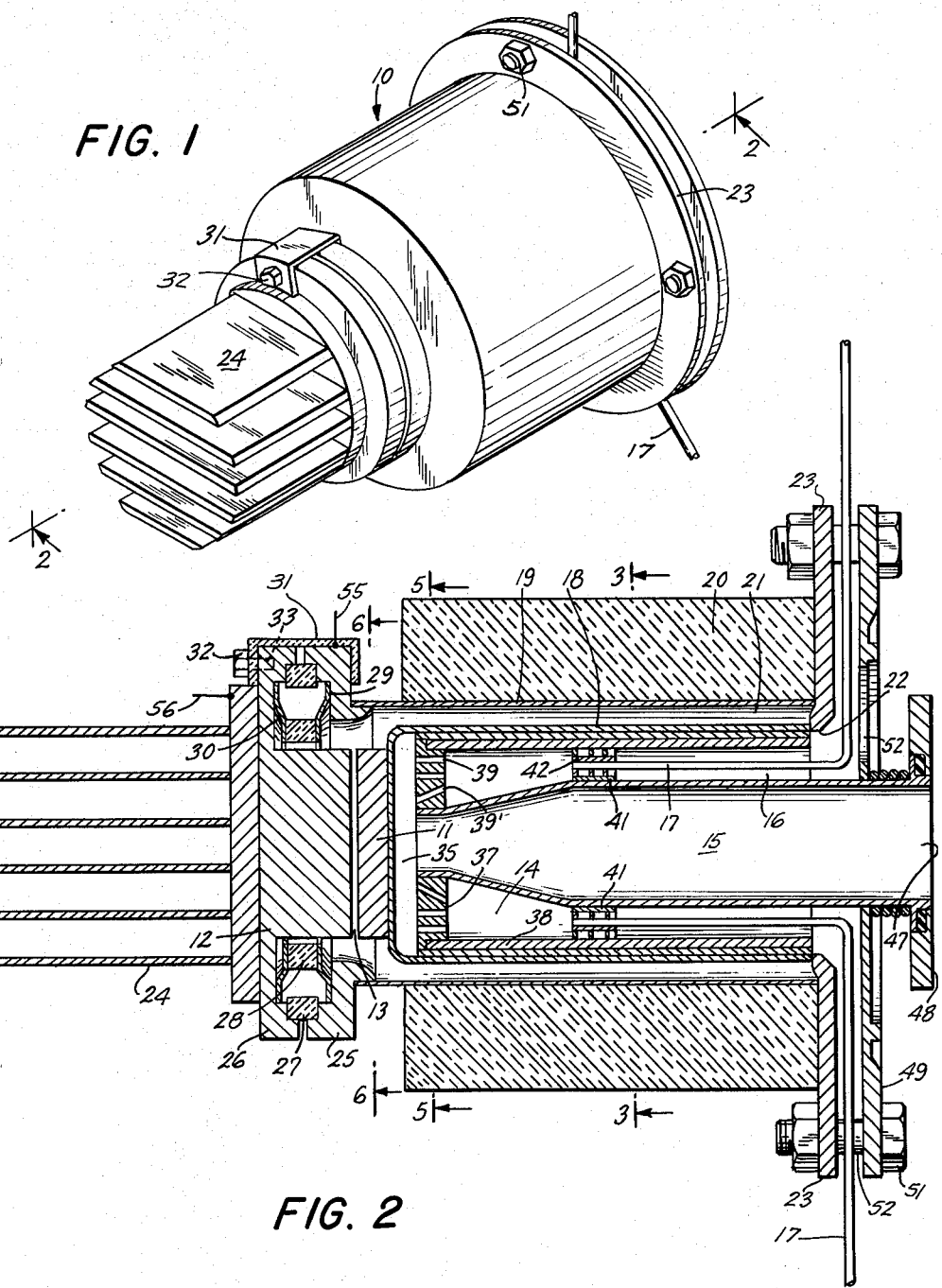

March 29, 1966  F. J. LYCZKO  3,243,612
FUEL FIRED THERMIONIC ENGINES
Filed June 12, 1962  3 Sheets-Sheet 1

INVENTOR.
FELIX J. LYCZKO
BY
Benjamin Sweedler
ATTORNEY

March 29, 1966  F. J. LYCZKO  3,243,612
FUEL FIRED THERMIONIC ENGINES
Filed June 12, 1962  3 Sheets-Sheet 2

INVENTOR.
FELIX J. LYCZKO
BY
Benjamin Sweedler
ATTORNEY

March 29, 1966 F. J. LYCZKO 3,243,612
FUEL FIRED THERMIONIC ENGINES
Filed June 12, 1962 3 Sheets-Sheet 3

INVENTOR.
FELIX J LYCZKO
BY
Benjamin Sweedler
ATTORNEY

United States Patent Office 3,243,612
Patented Mar. 29, 1966

3,243,612
FUEL FIRED THERMIONIC ENGINES
Felix J. Lyczko, Boxford, Mass., assignor to Thermo Electron Engineering Corporation, Waltham, Mass., a corporation of Delaware
Filed June 12, 1962, Ser. No. 201,980
7 Claims. (Cl. 310—4)

This invention relates to fuel fired thermionic engines and more particularly to diodes, particularly diodes having an ionizable gas in the space separating the emitter and collector to reduce space charge, constructed and designed for operation to burn fluid fuel and thus supply the heat input to the emitter at high efficiencies and high power densities required for satisfactory operation of the diode and at the same time maintain the collector at the desired lower temperature for efficient conversion of the thermal energy into electrical energy, notwithstanding the close spacing between the emitter and collector.

Known thermionic engines or converters involve emitters of electron-emissive material in closely spaced relation relative to the surface of the collectors, maintained under vacuum, with and without ionizable vapor such as cesium, cesium fluoride, cesium iodide, and other alkali metals which ionize easily and negate space charge. Such diodes are disclosed, for example in the work entitled "Conversion of Heat to Electricity," published by Wiley Publications, March 1960. In the operation of current cesium vapor diodes designed from presently available materials, at the lowest operative temperature to generate current, namely 2400° F. (1330° C.), about 550 B.t.u./hr. per square inch of emitter surface (25 watts/cm.$^2$) are required. As the operating temperature of the diode is increased, the required heat flux density also increases; at 2900° F. (1600° C.) the required heat flux density is of the order of 1300 B.t.u./hr. per in.$^2$ of surface (60 watts/cm.$^2$). From these values the problems of heat transfer in a thermionic diode, in which the emitter or emitters are heated by combustion of fuel, should be at once evident. These problems are aggravated by the very structural characteristics inherent in thermionic diodes which make them attractive for many uses, e.g., their relatively small size and weight, their compactness and their simplicity involving no moving parts.

Diodes in which the emitter or emitters are heated by combustion products involve, of course, the problem of efficient combustion of fuel and the major problem of heat transfer to obtain high operating temperatures and high heat flux densities for satisfactory operation of the diode. Unfortunately, however, certain of the conditions required for easy or good combustion make for difficult convective heat transfer. For example, for efficient combustion the velocity of the air or other oxygen-containing gas supporting combustion of the fuel should be low and the range of fuel to air should be kept within close limits to supply just the proper amount of oxygen. These conditions required for good combustion introduce difficulties in obtaining convective heat transfer.

It is a principal object of the present invention to provide thermionic engines, including diodes and triodes such as those disclosed, for example, in the Hatsopoulos et al. United States Patent 2,915,652, granted December 1, 1959, designed to efficiently burn fluid fuel to supply the heat input to the engines and effect transfer of the heat thus generated with high heat flux densities to the emitters to heat and maintain the emitters at the desired high temperatures required for operation of the thermionic engines.

Another object of this invention is to provide fluid fuel fired, particularly natural gas fired, thermionic engines in which the fuel is burned efficiently, transfer of heat generated is effected at high heat flux densities effectively, the heat content of the exiting products of combustion is employed to pre-heat the air or other oxygen-containing gas to support combustion of the fuel, and the component parts are arranged to produce a compact, efficient diode construction.

Still another object of this invention is to provide a method of supplying heat to the emitters of thermionic engines by combustion of fuels, which method gives improved heat flux densities with consequent improved heat transfer.

These and other objects and advantages of the present invention will be apparent from the following specification taken in connection with the accompanying drawings which show, for purposes of exemplification, preferred embodiments of this invention to which, however, the invention is not confined.

Figure 3:
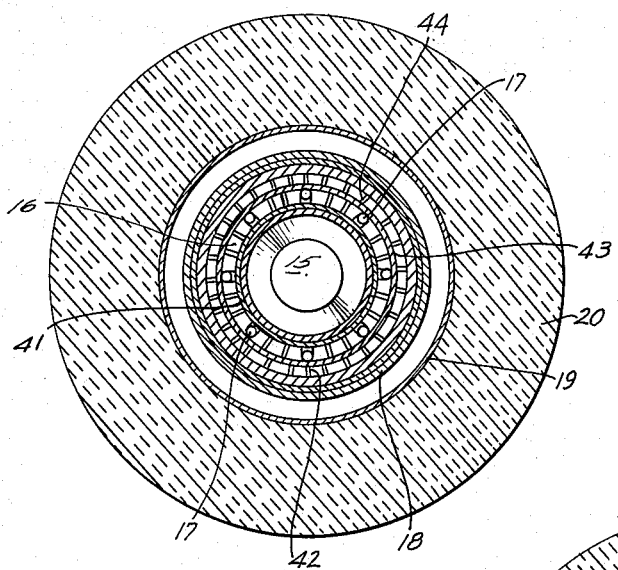
Figure 4:
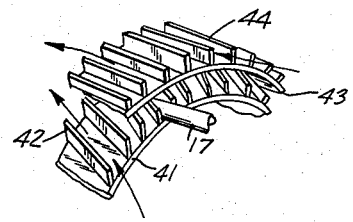
Figure 5:
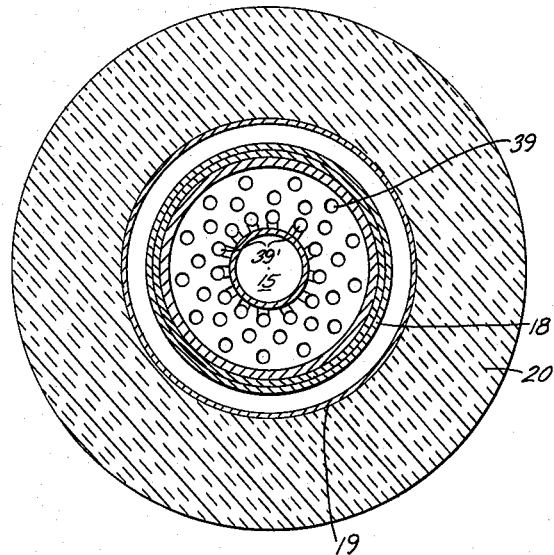
Figure 6:
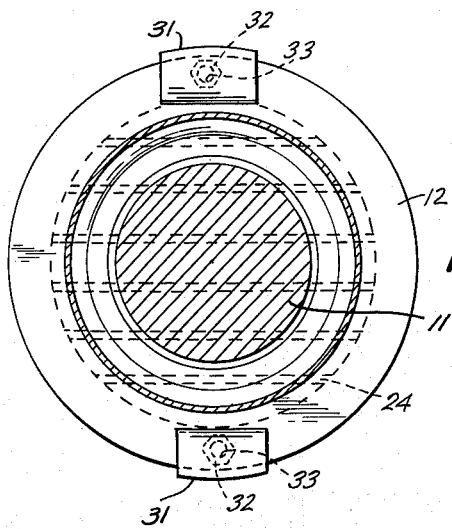
Figure 7:
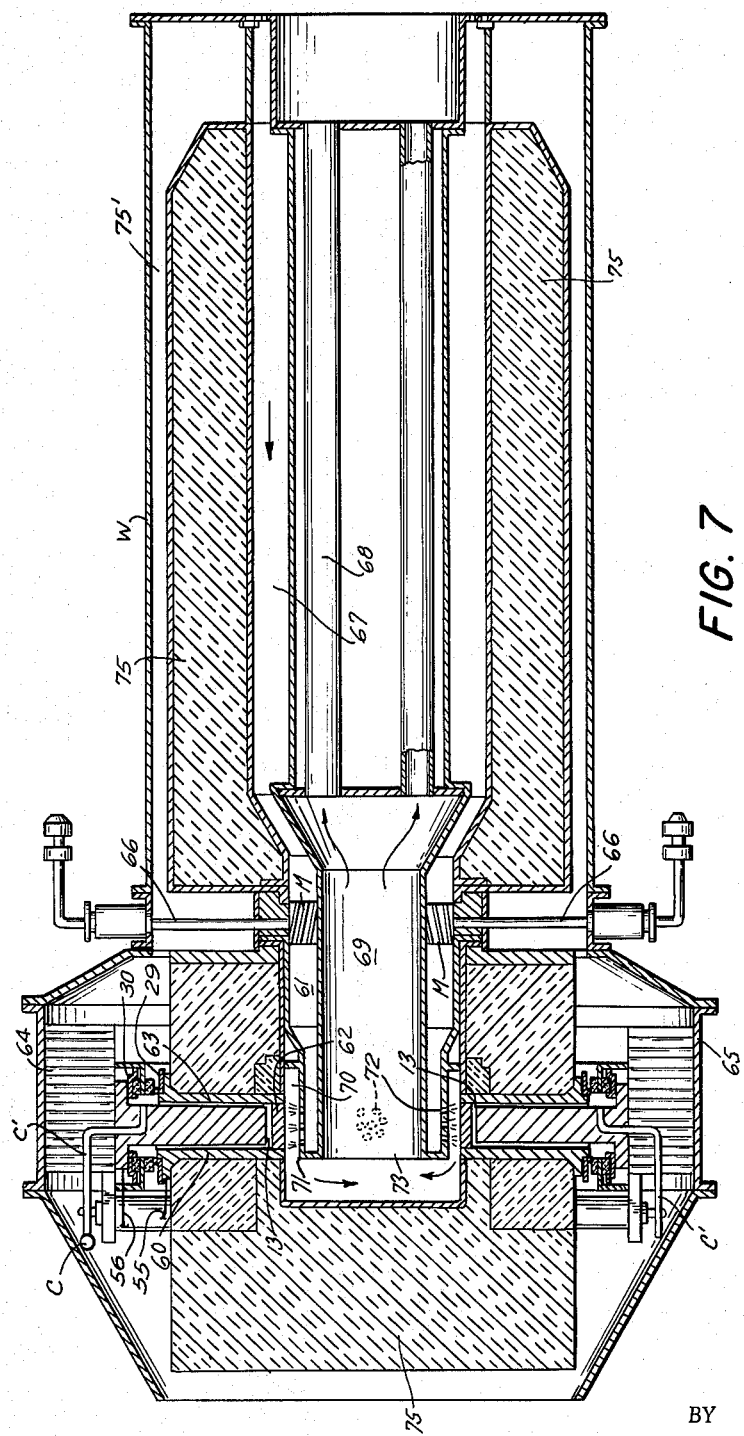

In the drawings:
FIGURE 1 is a perspective view of a diode embodying this invention;
FIGURE 2 is a section passing through the longitudinal axis of the diode taken in a plane passing through line 2—2 on FIGURE 1;
FIGURE 3 is a vertical section at right angle to the section of FIGURE 2 and taken in a plane passing through line 3—3 of FIGURE 2;
FIGURE 4 is a perspective view showing a preferred arrangement of baffles or vanes througgh which the fuel and oxygen-containing gas, e.g., air, is admitted to the combustion chamber to obtain good mixing of these media;
FIGURE 5 is a vertical section taken in a plane passing through line 5—5 on FIGURE 2;
FIGURE 6 is a vertical section taken in a plane passing through line 6—6 on FIGURE 2; and
FIGURE 7 is a vertical section of a modified construction involving a plurality of diodes arranged radially relative to one combustion chamber.

Referring to FIGURES 1 and 2 of the drawings, the construction shown involves a housing 10 having therein an emitter 11, a collector 12 separated from the emitter by space 13 to which, if desired, cesium or other ionizable gas which negates space charge can be supplied from a reservoir, not shown. While in the embodiment shown the housing is cylindrical, any desired shape can be employed. Contiguous to the emitter is a combustion chamber 14 having a centrally disposed exhaust tube 15 through which the products of combustion are discharged in heat exchange relation with the annular chamber 16 to which air or other oxygen gas is supplied to support combustion of fuel, e.g., natural gas, introduced through fluid fuel lines 17. The outer wall of the hot shell 18 of the combustion chamber 14 cooperates with a spaced wall, the so-called "cold wall," 19 to define an annular space 21 maintained under vacuum, i.e., connected to a vacuum pump or evacuated and then sealed. In the case of a cesium diode the vacuum is of the order of 1/10 mm. of mercury. For other ionizable vapors the vacuum will depend on the vapor pressure of the vapor used. Where no ionizable vapor is used, a vacuum as high as obtainable is employed, the higher the vacuum the better. A vacuum of at least 10$^{-4}$ or 10$^{-5}$ mm. of mercury should be employed.

It will be noted from FIGURE 2 that the wall 19 is provided with a relatively thick layer of heat insulation 20, which minimizes or completely prevents loss of heat. Thus the annular chamber 16 and the combustion chamber 14 are effectively insulated against loss of heat through the cylindrical wall 18 by the evacuated space 21 and through the concentric wall 19 by the insulation 20.

The space 13 between the emitter 11 and collector 12 communicates with annular evacuated space 21 and is thus maintained under vacuum. Emitter 11 is supported by the hot shell 18 which is made of a suitable material of good heat conducting, high temperature- and oxidation-resistant material shaped as shown in FIGURE 1 in the form of a cylinder. The emitter 11 is secured to the base 22 of the shell 18 as by brazing. The ends of the hot shell 18 are secured to a supporting end closure disc 23 as by welding or other suitable gas-tight joint.

The emitter 11 in its entirety, or the surface opposite the collector 12, is of a suitable electron-emissive material. Suitable materials are rhenium, osmium, tantalum, molybdenum, iridium, tungsten and niobium; other electron-emissive materials can, of course, be used and this invention is not confined to those mentioned. The surface of collector 12 opposite the emitter can be of the same or a different electron-emissive material than that of the emitter and is chosen to give maximum electron flow from the emitter to the collector. The hot shell 18 which supports the emitter 11 can be of tantalum coated with an aluminum tin alloy to protect it against oxidation, or molybdenum protected with a suitable heat- and oxidation-resistant coating such as a molybdenum disilicide coating, or tungsten having a tungsten disilicide coating. Any high temperature-resistant material which is also good heat conducting and resistant to oxidation under conditions prevailing in the combustion chamber 14 can be used for the hot shell 18.

The collector 12 may be of copper or of other good heat conducting material having a surface opposite the emitter surface of electron-emissive material such as those mentioned for the emitter. An all copper collector can be used, in which case a plurality of cooling fins 24 can be integral with the collector. The cooling fins 24 can be of any relatively light, good thermal conducting material such as aluminum or copper. Desirably they are brazed or otherwise secured to the collector 12 spaced approximately one-fourth inch apart in the form of plates as shown in FIGURES 1 and 2 in the drawing which provide good heat exchange between the collector and the atmosphere, and thus maintain the collector at the desired temperature differential relative to the temperature of the emitter. In the case of the diode, such as that disclosed, for example, in the Hatsopoulos et al. application Serial No. 723,336, filed March 24, 1958, which issued as Patent No. 3,054,914 on September 18, 1962, the temperature differential should be at least 350° F., preferably from 400° F. to 500° F.

The collector 12 in the embodiment shown in FIGURE 2 of the drawings is supported by the left hand end (viewing FIGURE 2) of the cold wall 19. The opposite end of the cold wall 19, as shown in FIGURE 2, is secured to the supporting disc. The left hand end of the wall 19 has mounted thereon an annular plate 25 of electrically-conducting, high temperature-resistant material such as protected tantalum or molybdenum hereinabove disclosed. The plate 25 is maintained in the desired spaced relation relative to an integral extension 26 of the collector 12 by spacers 27 of electrically-insulating refractory material. Any desired number of such spacers 27 can be used, preferably three equi-spaced circumferentially. In this manner the collector 12 is positioned relative to the emitter 11 spaced from the emitter 11 by the space 13, the extent of which is controlled by the spacers 27.

The annular plate 25 is maintained electrically-insulated from the collector 12 by the insulating spacers 27 and by insulators 28 which are attached to metal plates 29 and 30. These plates are made of suitable alloys such as copper-nickel alloy or other suitable material of construction having the desired coefficient of expansion and contraction when subjected to temperature changes. The insulators 28 may be of aluminum oxide or other suitable electrically-insulating material effecting electrical insulation of the annular plate 25 relative to the collector 12. The metal plates 29 and 30 are secured respectively as by brazing to the annular plate 25 and the collector, as shown in FIGURE 2.

The assembly of the annular plate 25 and the integral extension 26 of the collector 12 are maintained in tight engagement with the above described insulating spacers 27 by substantially U-shaped clamps 31 as shown in FIGURE 2 of electrically-insulating ceramic or other electrically-insulating material. The clamp shown in the drawings involves a substantial U-shaped member having a threaded opening through which the threaded bolt 32 (FIGURES 2 and 6) passes into an opening 33 in the extension 26 of the collector 12. FIGURE 6 shows two such clamps at diametrically opposite points; any desired number of such clamps can, of course, be used.

The collector 12 is thus supported relative to the emitter 11 in spaced relation providing the interelectrode space 13, which can have therein an ionizable vapor such as cesium or other such vapor negating space charge, with the emitter 11 electrically-insulated relative to the collector 12 and with adequate provision for relative expansion and contraction due to differential temperatures to which the collector and emitter are subjected when heating up, cooling down or in operation.

A heat exchange plenum chamber 35 is positioned contiguous to the surface of the emitter 11 to be heated. This plenum chamber 35 communicates with the inlet end of the exhaust tube 15. An accelerating orifice plate 37 is positioned contiguous to this plenum chamber. One side (the left hand side viewing FIGURE 2) of the orifice plate 37 defines one wall of the plenum chamber 35, the opposite wall of which plenum chamber is defined by the heated surfaces of the emitter 11. Orifice plate 37 is cylindrical in shape and is supported at its periphery within the combustion chamber 14 and thus mounted therein by a liner 38. This liner and the orifice plate 37 are of high temperature-resistant, oxidation-resistant material, such, for example, silicon carbide preferably, or tantalum or molybdenum, provided with surface coatings such as those hereinabove disclosed which protect the surfaces against oxidation.

The orifice plate 37 has a multiplicity of small openings 39 passing therethrough, desirably evenly spaced. The one or two circular rows of orifices 39 adjacent the outer periphery of the accelerating orifice plate 37 extend in a longitudinal direction, i.e., their axes are substantially parallel with the longitudinal axis of the combustion chamber. One or more inner rows of orifices 39' are inclined in a direction toward the center of the emitter 11. In this way when the products of combustion generated in the combustion chamber 14 pass through the openings in accelerating orifice plate 37 a multiplicity of jets result in the plenum chamber which impinge on the surface of the emitter to be heated. Those jets formed upon passage of the combustion products through the openings 39 impinge at right angles to the surface of the emitter. Those jets formed by passage of the combustion products through openings 39' impinge at an angle to the surface of the emitter to be heated. The inclined openings 39' are disposed to provide jets which impinge on the surface of the emitter opposite the inlet to the exhaust tube 15. The total number of openings 39 and 39' and their spacing is such that jets are produced which impinge on substantially the entire area of the surface of the emitter to be heated. In this context, the end of the wall 18 is regarded as a part of the emitter.

The cross-sectional area of the jets are controlled by the cross-sectional area of the openings 39 and 39' in the accelerating orifice plate 37. The smaller the cross-sectional area of these openings the better, provided they are not so small that they will become clogged during operation by finely divided particles in the combustion products. For an emitter having a diameter of 1½ inches, 20 to 40 openings evenly spaced, each having a diameter of from 80 to 96 mils has been found effective. This data is, of course, given for exemplary purposes. It will be understood that an orifice plate can be used having any desired number of openings which result in the formation of a multiplicity of closely spaced, small cross-sectional area jets flowing through the heat exchange plenum chamber 35 and impinging on the surface of the emitter to be heated so that substantially the entire area of this surface has these fine jets playing thereon, thus minimizing, if not completely preventing, retention of stagnant gas or a laminar boundary layer of gas on this surface.

As clearly shown in FIGURES 2, 3, 4 and 5 of the drawings, the fuel supply lines 17 extend through the annular chamber 16 and terminate at the inlet end of the combustion chamber 14 to supply fuel to the combustion chamber. In FIGURE 3, eight fuel supply lines 17 are shown but any desired number can be used. The discharge ends of these fuel supply lines are positioned, as best shown in FIGURE 4, directly above an annular plate or ring 41 which rests on the outer wall of the exhaust tube 15. FIGURE 4 is a view of the upper (relative to the showing of FIGURE 2) portion of the mechanism for effecting turbulent mixing of the fuel and oxygen-containing gas at the inlet to the combustion chamber 14.

Annular plate 41 has thereon a plurality of spaced baffles or vanes 42 which are angularly disposed relative to the longitudinal axis of the combustion chamber as clearly shown in FIGURE 4. A second concentric annular ring 43 is positioned just above the tops of the baffles 42 and has thereon a plurality of baffles or vanes 44 also angularly disposed but in a direction opposite that of the baffles 42 on the lower ring 41. The oxygen-containing gas, which can be air or oxygen enriched air, is supplied from any suitable source to the annular pre-heating chamber 16 where it flows in heat exchange relation with the products of combustion exiting through the exhaust tube 15. The oxygen-containing gas stream thus enters and flows through the spaces between the baffles 42 on the lower ring 41 and the baffles 44 on the upper ring 43, which baffles impart turbulent motion to the flowing oxygen-containing gas stream as it enters the combustion chamber 14.

The fuel, preferably natural gas or other combustible medium, liquid or gas, is discharged by the tubes 17 in the area where turbulence of the oxygen-containing gas is effected. Thus a turbulent mixture of fuel and oxygen-containing gas is produced which enters the combustion chamber 14 and burns therein. The proportion of fuel and oxygen-containing gas should be such as to obtain complete combustion with little or no excess of oxygen-containing gas. Combustion has been effected utilizing atmospheric air introduced into pre-heating chamber 16 and natural gas as the fuel to generate temperatures in excess of 2000° F. Using oxygen enriched air higher temperatures are obtained. Temperatures as high as 4500° F. can be obtained with air and natural gas in the equipment herein disclosed. These temperatures refer to the temperatures of the combustion products at the exit end of the combustion chamber.

The oxygen-containing gas is supplied at a pressure just above ambient. Desirably the pressure of the oxygen-containing gas is not more than about six inches of water. The fuel, e.g., natural gas, is supplied at a pressure slightly above the pressure of the oxygen-containing gas. In the operation of an electronic engine it is important that the power consumption for the supply of the fuel and the oxygen-containing gas be kept at a minimum. It is a feature of this invention that the fuel and oxygen-containing gas are supplied at relatively low pressures, say not exceeding about six inches of water for the oxygen-containing gas supply and a slightly higher pressure for the fuel gas supply, which higher pressure does not exceed the pressure at which natural gas, for example, is readily available, so that little power is required to provide the fuel and oxygen-containing gas supply to the thermionic engine. Obviously, the smaller the power requirements for the input of oxygen-containing gas and fuel to the combustion chamber, the larger the net power output of the thermionic engine.

The exhaust tube 15 which can be of silicon carbide or other suitable high temperature, heat-conducting material is provided at its exit end 47 with a supporting disc 48 which enables connection, if desired, of the exit end of the exhaust tube 15 to a waste heat boiler or other economizer for conserving residual heat in the combustion products. The exhaust tube 15 passes through a supporting disc 49 bolted at spaced points to the disc 23 by bolts 51 which pass through suitable spacers 52 positioned between the discs 23 and 49. The fuel lines 17, it will be noted, are positioned in the space between these discs 23 and 49. Disc 49 has in its face spaced openings 52 through which air enters the annular chamber when air is used as the oxygen-containing gas to support combustion of the fluid fuel. Using oxygen enriched gas, such gas is supplied to the annular chamber 16 directly or, if desired, oxygen can be admitted to this chamber for admixture with the air flowing therethrough, the resultant mixture being pre-heated as it passes through the annular chamber 16 in indirect heat exchange with products of combustion flowing through the exhaust tube 15.

In FIGURE 2, 55 is the electrically-conducting lead communicating with the emitter, and 56 the lead communicating with the collector. Power or D.C. current generated by the thermionic engine is withdrawn through these leads. Lead 55 communicates with the emitter 11 through the annular plate 25 which is electrically-insulated from the collector 12 by the spacers 27 and 28, and is in electrical communication with the emitter through the housing walls 18 and 19, both secured to metal supporting disc 23.

In the operation of the thermionic engine of FIGURES 1 to 6, fuel, preferably natural gas, is supplied through the fuel lines 17, and the fuel is discharged in the area of turbulence effected by the baffles 42, 44 of the pre-heated oxygen-containing gas flowing through the spaces between these baffles. A turbulent mixture of fuel and oxygen-containing gas is thus produced and enters the combustion chamber 14. Ignition can be effected by igniting the combustion gas from the exit end of the exhaust tube 15. The resultant flame travels through the exhaust tube, plenum chamber and combustion chamber. The products of combustion thus produced in combustion chamber 14 are jetted through the orifices 39, 39' in the accelerating orifice plate 37 through the plenum chamber 35 into impingement with substantially the entire area of the emitter 11 to be heated. The direct impingement of the multiplicity of small jets over substantially this entire area of the emitter 11 to be heated results in elimination of stagnant gas and laminar boundary layer contiguous to the emitter surface to be heated with consequent efficient transfer of heat under high-heat flux densities from the combustion products to the emitter. The multiplicity of jets merge into a common stream which flows through the plenum chamber 35 and exits through the exhaust tube, 15 giving up heat to the incoming oxygen-containing gas.

The arrangement of the annular pre-heating chamber 16, the combustion chamber 14, and the plenum chamber 35 communicating with the exhaust tube (15 which is thus in heat exchange relation both with the combustion chamber 14 and the annular pre-heating chamber 15) results in high heat efficiency and high heat transfer to the emitter. The latter is accomplished by the jetting of the combustion products in a multiplicity of small jets in impingement with the surface of the emitter to be heated, which jets cover substantially the entire surface and are formed by the orifices 39, 39' in the accelerating orifice plate 37.

Operating as hereinabove disclosed with the oxygen-containing gas supplied at a pressure of just above atmospheric and below six inches of water, natural gas at a slightly higher pressure, and with the orifice openings dimensioned as hereinabove set forth for a 1½ inch diameter emitter, jet velocities of about 350 feet per second are obtained. The accelerating orifice plate for any given installation should be designed to give jet velocities of at least 100 feet per second, preferably about 350 feet per second. The jet velocity is, of course, determined by the cross-sectional area of the orifice openings.

In the modification of FIGURE 7, a multiplicity of diodes 60 are arranged radially relative to a central annular combustion chamber 61. Each diode 60 comprises an emitter 62 spaced from a collector 63 having cooling fins 64. Since these diode constructions can be of the same type as disclosed above in connection with FIGURES 1 to 4, inclusive, further description thereof is believed unnecessary except to note that any desired number of them can be arranged in spaced relation within a housing 65 so that the cooling fins 64 are positioned contiguous to the housing 65 as shown in FIGURE 7, and the emitter 62 of each diode of the group is positioned contiguous to the combustion chamber 61.

Parts of FIGURE 7 which correspond with those of FIGURES 1 to 5, inclusive, are identified by the same reference characters.

In FIGURE 7, the combustion chamber 61 is supplied with fuel through the fuel inlets 66 and with oxygen-containing gas through annular space 75' and the ducts 67 in heat exchange relation with ducts 68 through which pass the products of combustion exiting from the exhaust chamber 69 which communicates with the plenum chamber 70. Mixing of the oxygen-containing gas and fuel takes place as these media are delivered to and flow through the vaned mixers M which produce turbulent mixtures of these media at the inlet end of the annular combustion chamber 61.

In the modification of FIGURE 7, the plenum chamber 70 is annular in shape and has wall 71 thereof contiguous to the surface of the emitter to be heated. Wall 71 has therein a plurality of orifices 72 arranged to jet the combustion products passing therethrough on the emitter surface to be heated. These orifices, as shown in FIGURE 7, are arranged in groups, the groups being spaced from each other and each group being disposed opposite an emitter 62. The number of orifices in each group will, of course, depend on the emitter surface area; the number should be so chosen as to provide jets of small diameter cross-sectional area impinging on substantially the entire area of the emitter surface to be heated as hereinabove disclosed in connection with the description of the diode of FIGURES 1 to 6, inclusive.

The jets of combustion products after impinging on the emitter surfaces flow into a common stream which passes through the plenum chamber 70 into the inlet end 73 of the exhaust tube 69.

In FIGURE 7, 75 indicates insulation provided about the combustion chamber and the exhaust tubes for combustion products to conserve heat. As indicated, annular space 75' between the outer wall of the housing W and the layer of insulation 75 serves to supply oxygen-containing gas to the combustion chamber 61. A blower or fan (not shown) communicates with annular space 75' and the ducts 67 to supply the inlet ends thereof with air or other oxygen containing gas.

Cesium reservoir tube C of each diode 60 communicates with a passageway C'. This passageway C' is communicably connected with the space 13 between the collector and the emitter through the annular space shown in FIGURE 7 surrounding the collector. Space 13 is evacuated through passageway C' which, after evacuation has ben completed, is sealed. Cesium reservoir tube C contains a glass capsule of liquid cesium which when tapped slightly is readily broken to release the cesium into the evacuated area, including the space 13 between the emitter and collector.

The operation of the construction of FIGURE 7 should be evident from the above description of the invention. The structure of this figure differs primarily in that it involves simultaneously heating of a multiplicity of electronic engines or diodes rather than a single engine as in the case of FIGURES 1 to 5, inclusive.

It will be noted that the present invention provides a fuel fired electronic engine in which the fuel and oxygen-containing gas to support combustion thereof are supplied at relatively low pressure requiring little or no extraneous power for their supply to the engine and in which the combustion products generated are jetted through an accelerating orifice plate onto the surface of the emitter to be heated in the form of a multiplicity of closely spaced small cross-sectional area jets impinging on the surface of the area to be heated, thus minimizing, if not completely preventing, stagnant gas films or a laminar boundary layer on the surface of the emitter to be heated, with consequent improved heat transfer and under high heat flux densities from the combustion products generated in the combustion chamber to the emitter. The construction herein disclosed also provides for maintenance of the desired temperature differential between the emitter and collector, with necessary close spacing there between and with conservation of heat input both from the standpoint of efficient heating of the emitter and also conservation of residual heat in the combustion products to pre-heat the oxygen-containing gas employed to support combustion of the fuel.

This invention is not restricted to the present disclosure, including the embodiments shown in the drawings, otherwise than as defined by the appended claims.

What is claimed is:

1. A thermionic engine, in combination, an electron-emissive member having an electron-emissive surface, a collector positioned relative to said electron-emissive surface for the reception of electrons from said electron-emissive surface, a combustion chamber in heat exchange relation with said electron-emissive surface, means for supplying fluid fuel to said combustion chamber, means for supplying an oxygen-containing gas to support combustion of said fluid fuel in said combustion chamber, and means interposed between said combustion chamber and said electron emissive member for jetting the products of combustion in a multiplicity of jets onto said electron-emissive member to effect efficient heat transfer from said products of combustion to said electron-emissive member.

2. A thermionic engine, in combination, a plate-like emitter having an electron-emissive surface on one side and a high-temperature- oxidation-resistant surface on the opposite side, a collector positioned closely spaced relative to the electron-emissive surface side of said emitter, cooling fins on said collector, means for maintaining a vacuum in the space between said emitter and collector, a combustion chamber housing having a central duct for discharge of products of combustion positioned with the end of the combustion chamber which communicates with the inlet to said central duct positioned adjacent the high temperature- oxidation-resistant surface of said emitter, said combustion chamber having an annular chamber surrounding said central duct, means for passing oxygen-containing gas through said annular housing to pre-heat the said oxygen-containing gas, means for introducing a fluid fuel in admixture with the pre-heated air to produce a turbulent mixture of fluid fuel and oxygen-containing gas at the inlet to said combustion chamber, and an orifice plate having a multiplicity of small orifices therein positioned at the end of the combustion chamber adjacent the emitter and arranged to jet the combustion products onto the said oxidation-resistant surface of said emitter, the products of combustion thus jetted then flowing through said central duct.

3. A thermionic engine, in combination, a cylindrical housing, a circular plate-like emitter positioned with one side thereof contiguous to one end of said housing, a collector positioned close to but spaced from the other side of said emitter, cooling fins on said collector extending in substantially the same general direction as said cylindrical housing, a concentric housing enclosing the first mentioned housing and spaced therefrom to provide an annular space communicating with the space between the emitter and collector, which space is maintained under vacuum, an exhaust tube in said cylindrical housing having its axis coaxial with that of said housing and a smaller diameter to provide a central duct with an annular space surrounding said central duct, the inlet to said central duct being positioned close to but spaced from said emitter, means to supply oxygen-containing gas to said annular space, baffles in said annular space through which the oxygen-containing gas flows to impart turbulent flow thereto, means to supply fluid fuel to said annular space in the vicinity of said baffles to produce a turbulent mixture of fluid fuel and oxygen-containing gas, and an orifice plate spaced from said emitter in the space between the inlet end of said exhaust tube and said cylindrical housing having a multiplicity of orifices directed to jet the combustion products into impingement with substantially the entire area of said one side of said emitter to transfer heat of the products of combustion efficiently and with high heat flux densities to said emitter.

4. In a thermionic engine comprising an electron-emissive member having an electron-emissive surface, a collector positioned relative to said electron-emissive surface for the reception of electrons from said electron-emissive surface, means for heating said member by combustion of fluid fuel, comprising a combustion chamber in heat exchange relation with said electron-emissive member, means for supplying fluid fuel and oxygen-containing gas to said combustion chamber and a plate disposed between said combustion chamber and said member and having a plurality of small passages arranged to jet the combustion products thus produced in relatively small jets into impingement with said electron-emissive member, the number of said jets being sufficient to jet combustion products over the entire area of said member to be heated to maintain said area free of stagnant gases during the heating thereof.

5. In a thermionic engine, in combination, an electron-emissive member having an electron-emissive surface, a cylindrical combustion chamber housing, said surface positioned at one end of said housing, a collector positioned relative to said electron-emissive surface for the reception of electrons from said electron-emissive surface, a central exhaust tube haivng its axis coaxial with the axis of said housing extending from a point spaced from said surface to the opposite end of said housing, and an accelerating orifice plate positioned close to but spaced from said surface, said orifice plate having a central opening in which the inlet end of said exhaust tube is disposed, and said orifice plate having extending therethrough a multiplicity of closely spaced jet opening through which the combustion products generated in said combustion chamber are jetted to impinge on substantially the entire area of said surface to be heated, the jet streams thus impinging on said emitter flowing therefrom into and through said exhaust tube.

6. In a thermionic engine, in combination, a cylindrical combustion chamber housing, an emitter contiguous to one end of said housing in heat exchange relation therewith, a heat exchange plenum chamber positioned in one end of said housing contiguous to said emitter, a central exhaust tube leading from said plenum chamber and defining with its outer walls and the inner wall of said housing a combustion chamber and an annular pre-heating chamber communicating with said combustion chamber, an accelerating orifice plate disposed between the combustion chamber and said plenum chamber, said accelerating orifice plate having a multiplicity of closely spaced orifices through which the products of combustion flow and are jetted through the plenum chamber onto the surface of the emitter to be heated, means for supplying an oxygen-containing gas to the annular pre-heating chamber and fluid fuel to the exit end of the annular pre-heating chamber to form a turbulent mixture of said fuel and oxygen-containing gas at the inlet end of said combustion chamber.

7. A thermionic engine comprising, in combination, a plurality of emitters each having an electron-emissive surface arranged radially, each of said emitters having a cooperating collector for the reception of electrons from the electron-emissive surface cooperating therewith, a combustion chamber disposed centrally of the radial arrangement of said emitters, said combustion chamber communicating at its exit end with accelerating orifices arranged in groups with each group close to but spaced from an emitter, at least one exit duct communicating with the opposite end of said combustion chamber, an inlet duct in heat exchange relation with said exit duct for supplying an oxygen-containing gas to said combustion chamber, means for supplying fuel to said combustion chamber, the products of combustion produced passing through the combustion chamber and through said orifices forming a multiplicity of jets impinging on the surfaces of the emitters to be heated and thereafter flowing through said exit duct.

References Cited by the Examiner

UNITED STATES PATENTS

| | | | |
|---|---|---|---|
| 383,464 | 5/1888 | Gulcher | 136—4 |
| 2,881,384 | 4/1959 | Durant | 310—4 |
| 2,902,270 | 9/1959 | Salomonsson et al. | 158—99 |
| 3,137,798 | 6/1964 | Noyes | 310—4 |

ORIS L. RADER, *Primary Examiner.*

MILTON O. HIRSHFIELD, *Examiner.*

J. W. GIBBS, *Assistant Examiner.*